(12) United States Patent
Justak

(10) Patent No.: US 7,896,352 B2
(45) Date of Patent: Mar. 1, 2011

(54) SEAL WITH STACKED SEALING ELEMENTS

(76) Inventor: John F. Justak, Stuart, FL (US)

( * ) Notice: Subject to any disclaimer, the term of this patent is extended or adjusted under 35 U.S.C. 154(b) by 487 days.

(21) Appl. No.: 11/953,099

(22) Filed: Dec. 10, 2007

(65) Prior Publication Data

US 2008/0100000 A1  May 1, 2008

Related U.S. Application Data

(63) Continuation-in-part of application No. 11/669,454, filed on Jan. 31, 2007, now Pat. No. 7,410,173, which is a continuation-in-part of application No. 11/226,836, filed on Sep. 14, 2005, now Pat. No. 7,182,345, which is a continuation of application No. 10/832,053, filed on Apr. 26, 2004, now abandoned.

(60) Provisional application No. 60/466,979, filed on May 1, 2003.

(51) Int. Cl.
*F16J 15/44* (2006.01)
*F01D 5/20* (2006.01)
*F01D 25/16* (2006.01)

(52) U.S. Cl. ............. 277/411; 277/412; 415/173.1; 415/231

(58) Field of Classification Search ........... 277/355, 277/411–412; 415/173.1, 231, 115, 138
See application file for complete search history.

(56) References Cited

U.S. PATENT DOCUMENTS

| | | | |
|---|---|---|---|
| 3,917,150 A | 11/1975 | Ferguson et al. | |
| 3,975,114 A * | 8/1976 | Kalkbrenner | 415/210.1 |
| 4,411,594 A | 10/1983 | Pellow et al. | |
| 4,600,202 A | 7/1986 | Schaeffler et al. | |
| 4,642,024 A * | 2/1987 | Weidner | 415/116 |
| 4,650,394 A * | 3/1987 | Weidner | 415/115 |
| 4,676,715 A * | 6/1987 | Imbault et al. | 415/116 |
| 5,026,252 A | 6/1991 | Hoffelner | |
| 5,181,728 A | 1/1993 | Stec | |
| 5,183,197 A | 2/1993 | Howe | |
| 5,755,445 A | 5/1998 | Arora | |
| 5,799,952 A | 9/1998 | Morrison et al. | |
| 5,944,320 A | 8/1999 | Werner et al. | |
| 5,997,004 A | 12/1999 | Braun et al. | |
| 6,079,714 A | 6/2000 | Kemsley | |
| 6,079,945 A | 6/2000 | Wolfe et al. | |
| 6,254,344 B1 | 7/2001 | Wright et al. | |
| 6,331,006 B1 * | 12/2001 | Baily et al. | 277/355 |
| 6,428,009 B2 | 8/2002 | Justak | |
| 6,435,820 B1 * | 8/2002 | Overberg | 415/138 |
| 6,558,041 B2 | 5/2003 | Laos | |
| 6,840,519 B2 | 1/2005 | Dinc et al. | |
| 7,182,345 B2 | 2/2007 | Justak | |

FOREIGN PATENT DOCUMENTS

| | | |
|---|---|---|
| EP | 0 778 431 A1 | 6/1997 |
| JP | 4347066 A | 12/1992 |
| WO | 01/48887 A2 | 7/2001 |

* cited by examiner

*Primary Examiner* — Vishal Patel
(74) *Attorney, Agent, or Firm* — GrayRobinson, P.A.

(57) ABSTRACT

A hybrid seal for sealing the circumferential gap between a first machine component and a second machine component comprises at least one shoe extending along one of the machine components in a position to create a non-contact seal, at least one spring element connected between one of the machine components and the shoe(s) and a stack of sealing elements located within a slot formed in the shoe(s), wherein a primary seal and secondary seal of the circumferential gap is created by the shoe(s) in cooperation with the spring element(s) and sealing elements, respectively.

8 Claims, 4 Drawing Sheets

SEAL WITH STACKED SEALING ELEMENTS

RELATED APPLICATIONS

This application is a continuation-in-part application of U.S. patent application Ser. No. 11/669,454 filed Jan. 31, 2007, which is a continuation-in-part application of U.S. patent application Ser. No. 11/226,836 filed Sep. 14, 2005 and now U.S. Pat. No. 7,182,345 granted Feb. 27, 2007, which is a continuation of U.S. patent application Ser. No. 10/832,053 filed Apr. 26, 2004, now abandoned, which claims the benefit of U.S. Provisional Application Ser. No. 60/466,979 filed May 1, 2003, under 35 U.S.C. §119(e) for all commonly disclosed subject matter. U.S. Provisional Application Ser. No. 60/466,979 is expressly incorporated herein by reference in its entirety to form part of the present disclosure.

FIELD OF THE INVENTION

This invention relates to seals for sealing a circumferential gap between two machine components that are relatively rotatable with respect to each other, and, more particularly, to a seal having at least one shoe extending along one of the machine components in a position to create a non-contact seal therewith, and at least two sealing elements which contact the at least one shoe to provide a secondary seal of the gap between the two machine components.

BACKGROUND OF THE INVENTION

Turbomachinery, such as gas turbine engines employed in aircraft, currently is dependent on either labyrinth (see FIGS. 1A-1E), brush (see FIGS. 2A and 2B) or carbon seals for critical applications. Labyrinth seals provide adequate sealing but they are extremely dependent on maintaining radial tolerances at all points of engine operation. The radial clearance must take into account factors such as thermal expansion, shaft motion, tolerance stack-ups, rub tolerance, etc. Minimization of seal clearance is necessary to achieve maximum labyrinth seal effectiveness. In addition to increased leakage if clearances are not maintained, such as during a high-G maneuver, there is the potential for increases in engine vibration. Straight-thru labyrinth seals (FIG. 1A) are the most sensitive to clearance changes, with large clearances resulting in a carryover effect. Stepped labyrinth seals (FIGS. 1B and 1C) are very dependent on axial clearances, as well as radial clearances, which limits the number of teeth possible on each land. Pregrooved labyrinth seals (FIG. 1D) are dependent on both axial and radial clearances and must have an axial clearance less than twice the radial clearance to provide better leakage performance than stepped seals.

Other problems associated with labyrinth seals arise from heat generation due to knife edge to seal land rub, debris from hardcoated knife edges or seal lands being carried through engine passages, and excessive engine vibration. When seal teeth rub against seal lands, it is possible to generate large amounts of heat. This heat may result in reduced material strength and may even cause destruction of the seal if heat conducted to the rotor causes further interference. It is possible to reduce heat generation using abradable seal lands, but they must not be used in situations where rub debris will be carried by leakage air directly into critical areas such as bearing compartments or carbon seal rubbing contacts. This also holds true for hardcoats applied to knife edges to increase rub capability. Other difficulties with hardcoated knife edges include low cycle fatigue life debits, rub induced tooth-edge cracking, and the possibility of handling damage. Engine vibration is another factor to be considered when implementing labyrinth seals. As mentioned previously, this vibration can be caused by improper maintenance of radial clearances. However, it can also be affected by the spacing of labyrinth seal teeth, which can produce harmonics and result in high vibratory stresses.

In comparison to labyrinth seals, brush seals can offer very low leakage rates. For example, flow past a single stage brush seal is approximately equal to a four knife edge labyrinth seal at the same clearance. Brush seals are also not as dependent on radial clearances as labyrinth seals. Leakage equivalent to approximately a 2 to 3 mil gap is relatively constant over a large range of wire-rotor interferences. However, with current technology, all brush seals will eventually wear to line on line contact at the point of greatest initial interference. Great care must be taken to insure that the brush seal backing plate does not contact the rotor under any circumstances. It is possible for severing of the rotor to occur from this type of contact. In addition, undue wire wear may result in flow increases up to 800% and factors such as changes in extreme interference, temperature and pressure loads, and rubbing speeds must be taken into account when determining seal life.

The design for common brush seals, as seen in FIGS. 2A and 2B, is usually an assembly of densely packed flexible wires sandwiched between a front plate and a back plate. The free ends of the wires protrude beyond the plates and contact a land or runner, with a small radial interference to form the seal. The wires are angled so that the free ends point in the same direction as the movement of the runner. Brush seals are sized to maintain a tight diametral fit throughout their useful life and to accommodate the greatest combination of axial movement of the brush relative to the rotor.

Brush seals may be used in a wide variety of applications. Although brush seal leakage generally decreases with exposure to repeated pressure loading, incorporating brush seals where extreme pressure loading occurs may cause a "blow over" condition resulting in permanent deformation of the seal wires. Brush seals have been used in sealing bearing compartments, however coke on the wires may result in accelerated wear and their leakage rate is higher than that of carbon seals.

One additional limitation of brush seals is that they are essentially uni-directional in operation, i.e., due to the angulation of the individual wires, such seals must be oriented in the direction of rotation of the moving element. Rotation of the moving element or rotor in the opposite direction, against the angulation of the wires, can result in permanent damage and/or failure of the seal. In the particular application of the seals required in the engine of a V-22 Osprey aircraft, for example, it is noted that during the blade fold wing stow operation, the engine rotates in reverse at very low rpm's. This is required to align rotor blades when stowing wings. This procedure is performed for creating a smaller aircraft footprint onboard an aircraft carrier. Reverse rotation of the engine would damage or create failure of brush seals such as those depicted in FIGS. 2A and 2B.

Carbon seals are generally used to provide sealing of oil compartments and to protect oil systems from hot air and contamination. Their low leakage rates in comparison to labyrinth or brush seals are well-suited to this application but they are very sensitive to pressure balances and tolerance stack-ups. Pressure gradients at all operating conditions and especially at low power and idle conditions must be taken into account when considering the use of carbon seals. Carbon seals must be designed to have a sufficiently thick seal plate and the axial stack load path must pass through the plate as straight as possible to prevent coning of the seal. Another consideration with carbon seals is the potential for seepage, weepage or trapped oil. Provisions must be made to eliminate these conditions which may result in oil fire, rotor vibration, and severe corrosion.

According to the Advanced Subsonic Technology Initiative as presented at the NASA Lewis Research Center Seals Workshop, development of advanced sealing techniques to replace the current seal technologies described above will provide high returns on technology investments. These returns include reducing direct operating costs by up to 5%, reducing engine fuel burn up to 10%, reducing engine oxides of emission by over 50%, and reducing noise by 7 dB. For example, spending only a fraction of the costs needed to redesign and re-qualify complete compressor or turbine components on advanced seal development can achieve comparable performance improvements. In fact, engine studies have shown that by applying advanced seals techniques to just a few locations can result in reduction of 2.5% in SFC.

SUMMARY OF THE INVENTION

This invention is directed to a hybrid, non-contact seal for sealing the circumferential gap between a first machine component such as a stator and a second machine component such as a rotor which is rotatable relative to the stator.

In the presently preferred embodiment, the hybrid seal comprises at least one shoe extending along one of the rotor and stator in a position to create a non-contact seal therewith. At least one spring element is connected between one of the rotor and stator and the at least one shoe. The spring element(s) is flexible in the radial direction, but axially stiff so that it can function to assist in preventing roll over of the shoes with respect to the rotor or stator where it is located, thus maintaining an effective seal under pressure load. Preferably, stops are provided to limit the extent of radial motion of the shoe with respect to the rotor or stator. The spring elements deflect and move with the shoe(s) in response to the application of fluid pressure applied to the shoe(s) to create a primary seal, within design tolerances, along the gap between the machine components.

The shoe(s) is formed with a slot within which one end of a stack of at least two sealing elements is disposed. The opposite end of each sealing element is connected to one of the first and second machine components. The sealing elements deflect and move with the shoe(s) in response to the application of fluid pressure applied to the shoe(s) to create a secondary seal along the gap between the machine components. Preferably, each of the sealing elements comprises an outer ring formed with a number of circumferentially spaced openings within which a spring member is mounted. Each spring member is connected to at least one inner ring segment and these inner ring segments are located within the slot formed in the shoe(s). The sealing elements may be formed of sheet metal of varying thickness, or other suitable heat-resistant, flexible material.

The hybrid seal of this invention can be utilized in all seal applications, including labyrinth, brush and carbon. The robust design eliminates the careful handling now required of carbon seals utilized in lube system compartments. This seal may allow the engine designer to utilize less parts in the assembly as this seal will permit "blind" assemblies to occur.

The following table provides a comparison of the seal of the subject invention with currently available technology.

| Seal Type | Wear Rate | Leakage | Dependence on Clearances | Contamination Potential |
| --- | --- | --- | --- | --- |
| Labyrinth Seals | High | Low | High | High |
| Brush Seals | Medium | Low | Medium | Medium |
| Carbon Seals | Medium | Very Low | High | Low |
| Hybrid Seal | Low | Low | Low | Low |

DESCRIPTION OF THE DRAWINGS

The structure, operation and advantages of this invention will become further apparent upon consideration of the following description, taken in conjunction with the accompanying drawings, wherein.

DETAILED DESCRIPTION OF THE PREFERRED EMBODIMENTS

Figure 1A:
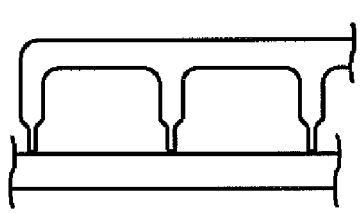
FIGS. 1A-1E are schematic views of a number of prior art labyrinth seals.
Figure 1B:
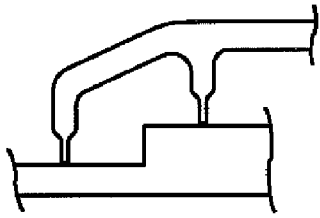
Figure 1C:
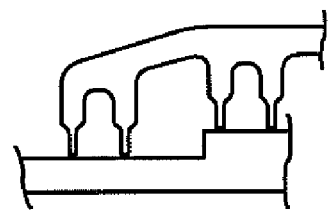
Figure 1D:
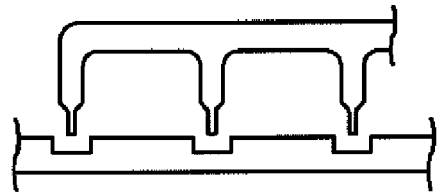
Figure 1E:
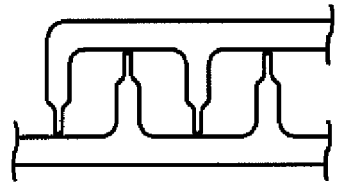
Figure 2A:
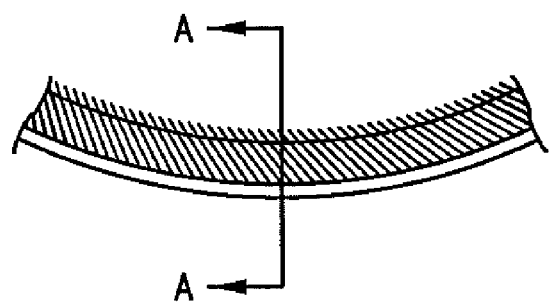
FIGS. 2A and 2B depict views of a prior art brush seal.
Figure 2B:
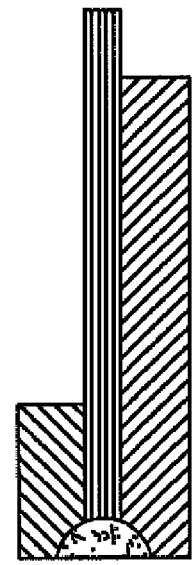

Referring now to FIGS. 3-6, the hybrid seal 10 of this invention is intended to create a seal of the circumferential gap 11 between two relatively rotating components, namely, a fixed stator 12 and a rotating rotor 14. The seal 10 includes at least one, but preferably a number of circumferentially spaced shoes 16 which are located in a non-contact position along the exterior surface of the rotor 14. Each shoe 16 is formed with a sealing surface 20 and a slot 22 extending radially inwardly toward the sealing surface 20. For purposes of the present discussion, the term "axial" or "axially spaced" refers to a direction along the longitudinal axis of the stator 12 and rotor 14, e.g. axis 18 shown in FIGS. 3 and 6, whereas "radial" refers to a direction perpendicular to the longitudinal axis 18.

Figure 3:
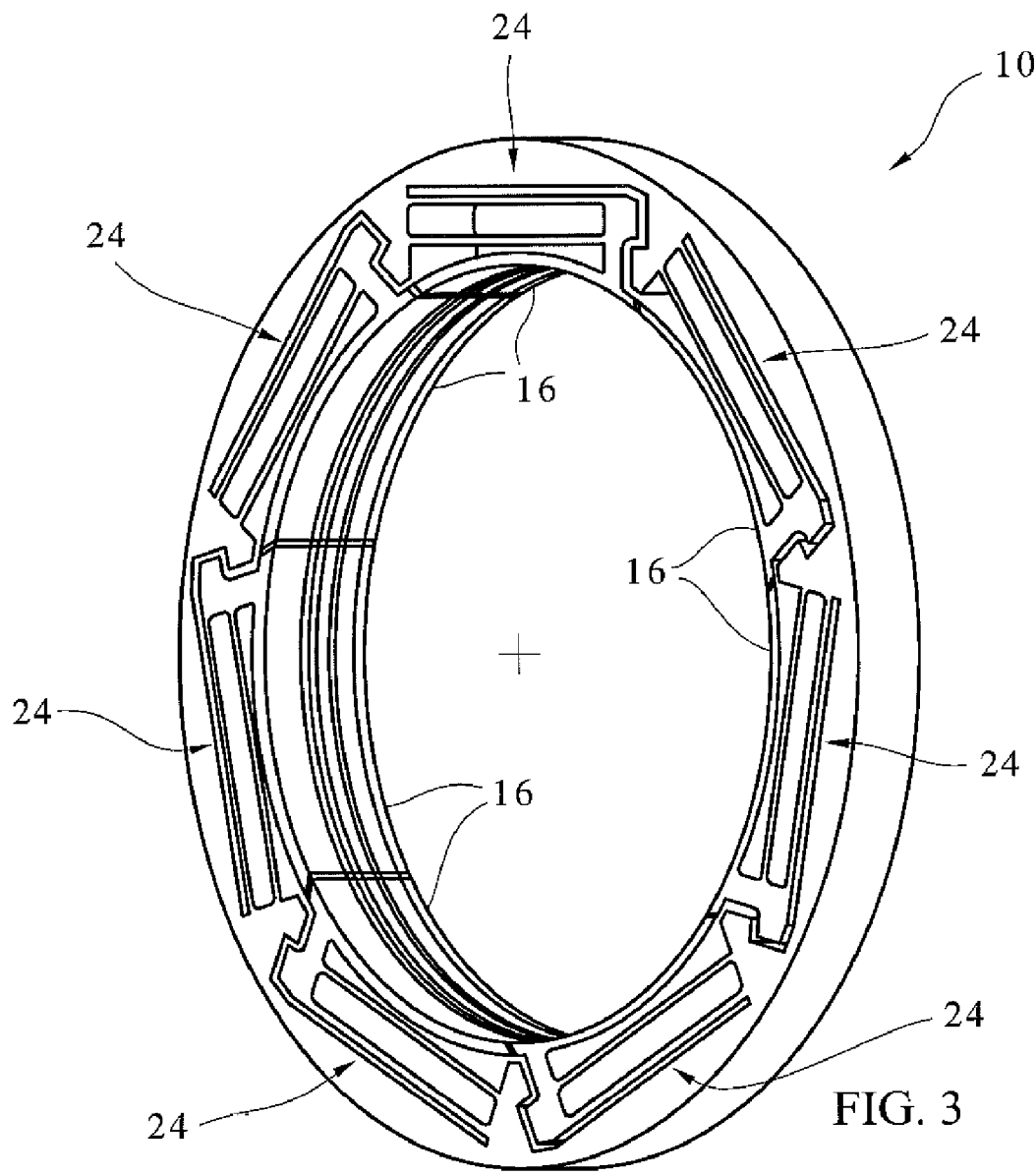
FIG. 3 is a perspective view of the hybrid seal of this invention.
Figure 4:
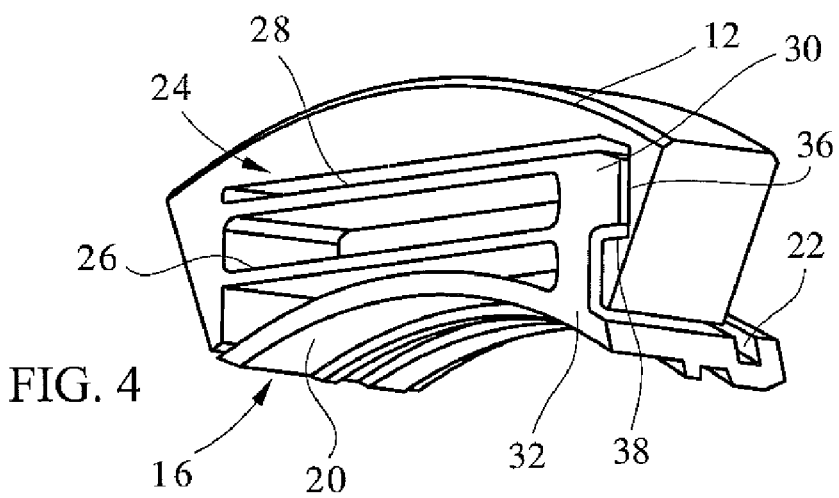
FIG. 4 is an enlarged perspective view of a portion of the seal depicted in FIG. 3, with the sealing elements removed.
Figure 5:
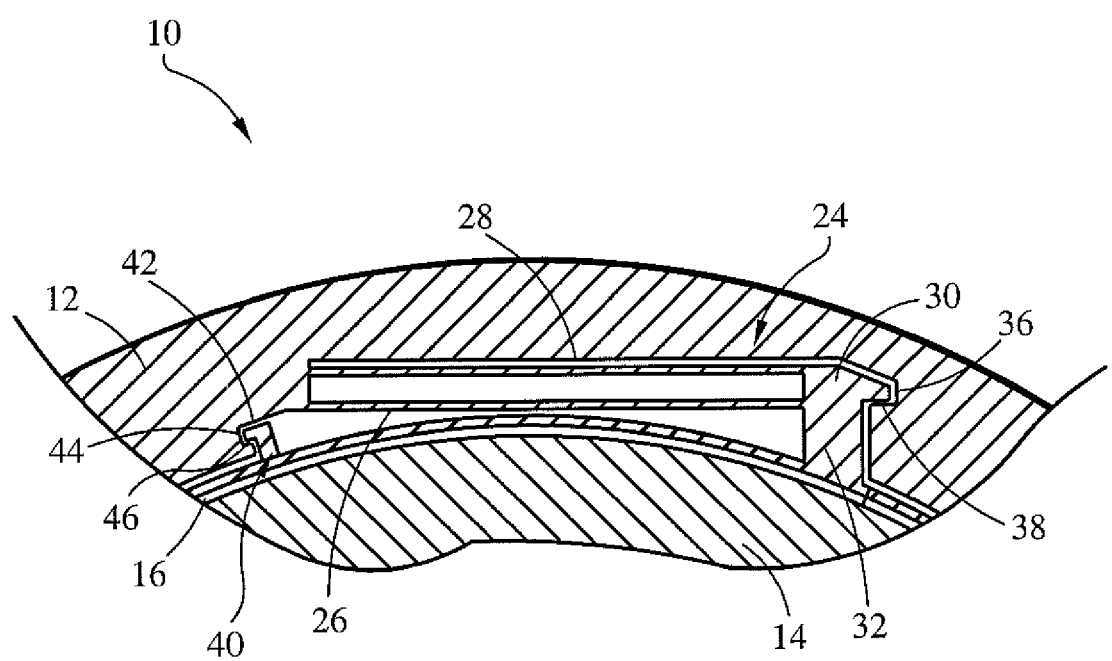
FIG. 5 is a cross sectional view of one of the spring elements and shoes.

Under some operating conditions, particularly at higher pressures, it is desirable to limit the extent of radial movement of the shoes 16 with respect to the rotor 14 to maintain tolerances, e.g. the spacing between the shoes 16 and the facing surface of the rotor 14. The seal 10 preferably includes a number of circumferentially spaced spring elements 24, the details of one of which are best seen in FIGS. 3 and 4. Each spring element 24 is formed with an inner band 26, and an outer band 28 radially outwardly spaced from the inner band 26. One end of each of the bands 26 and 28 is mounted to or integrally formed with the stator 12 and the opposite end thereof is connected to a first stop 30. The first stop 30 includes a leg 32 which is connected to or integrally with a shoe 16, and has an arm 34 opposite the shoe 16 which may be received within a recess 36 formed in the stator 12. The recess 36 has a shoulder 38 positioned in alignment with the arm 34 of the first stop 30.

A second stop 40 is connected to or integrally formed with the shoe 16. The second stop 40 is circumferentially spaced from the first stop 30 in a position near the point at which the inner and outer bands 26 and 28 connect to the stator 12. The second stop 40 is formed with an arm 42 which may be received within a recess 44 in the stator 12. The recess 44 has a shoulder 46 positioned in alignment with the arm 42 of second stop 40.

Particularly when the seal 10 of this invention is used in applications such as gas turbine engines, aerodynamic forces are developed which apply a fluid pressure to the shoe 16 causing it to move radially inwardly toward the rotor 14. The spring elements 24 deflect and move with the shoe 16 to create a primary seal of the circumferential gap 11 between the rotor 14 and stator 12. The purpose of first and second stops 30 and 40 is to limit the extent of radially inward and outward movement of the shoe 16 with respect to the rotor 14. A gap is provided between the arm 34 of first stop 30 and the shoulder 38, and between the arm 42 of second stop 40 and shoulder 46, such that the shoe 16 can move radially inwardly relative to the rotor 14. Such inward motion is limited by engagement of the arms 34, 42 with shoulders 38 and 46, respectively, to prevent the shoe 16 from contacting the rotor 14 or exceeding design tolerances for the gap between the two. The arms 34 and 42 also contact the stator 12 in the event the shoe 16 moves radially outwardly relative to the rotor 14, to limit movement of the shoe 16 in that direction.

Figure 6:
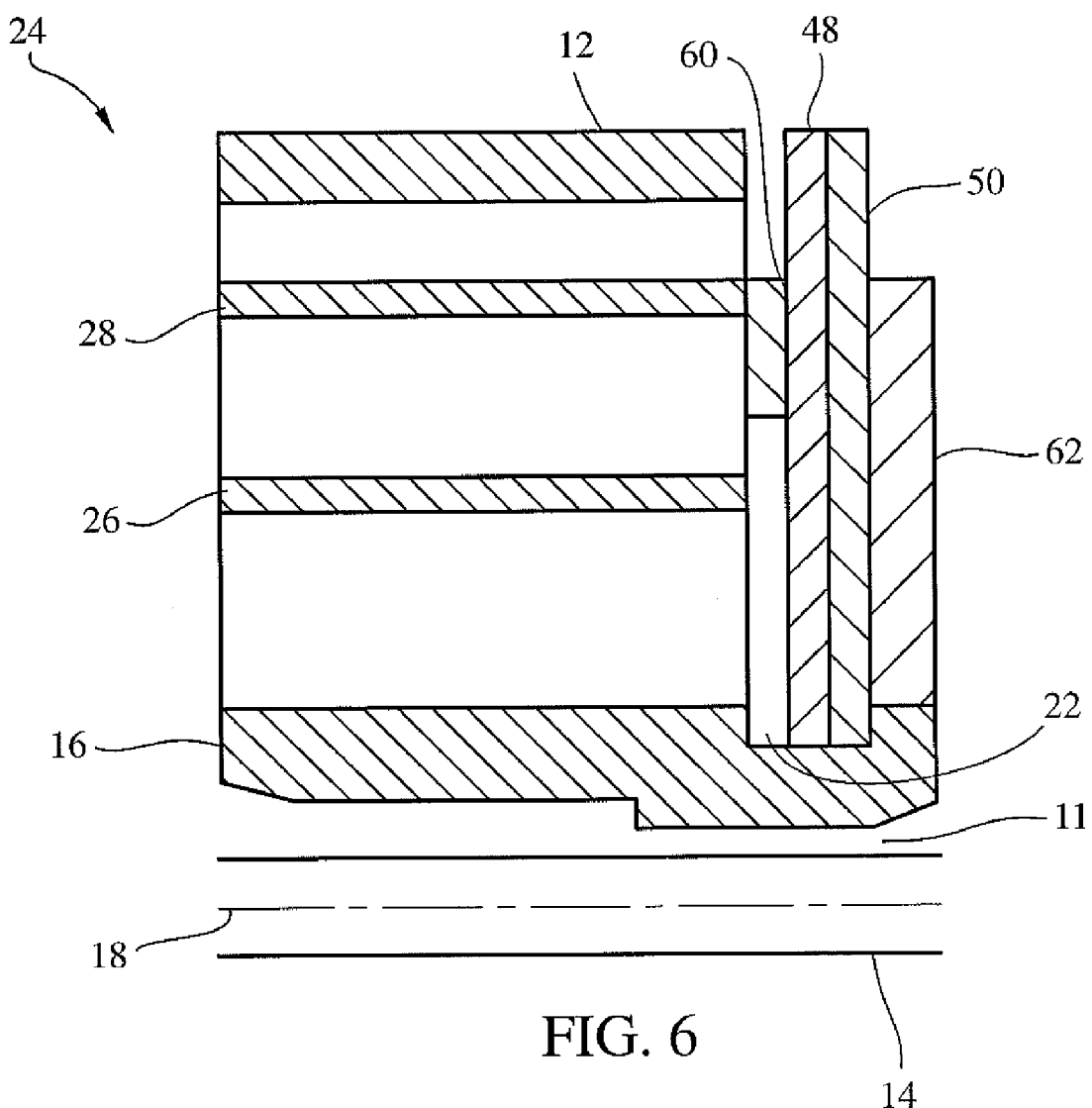
FIG. 6 is a cross sectional view of the seal shown in FIGS. 3 and 4 with the sealing elements inserted.
Figure 7:
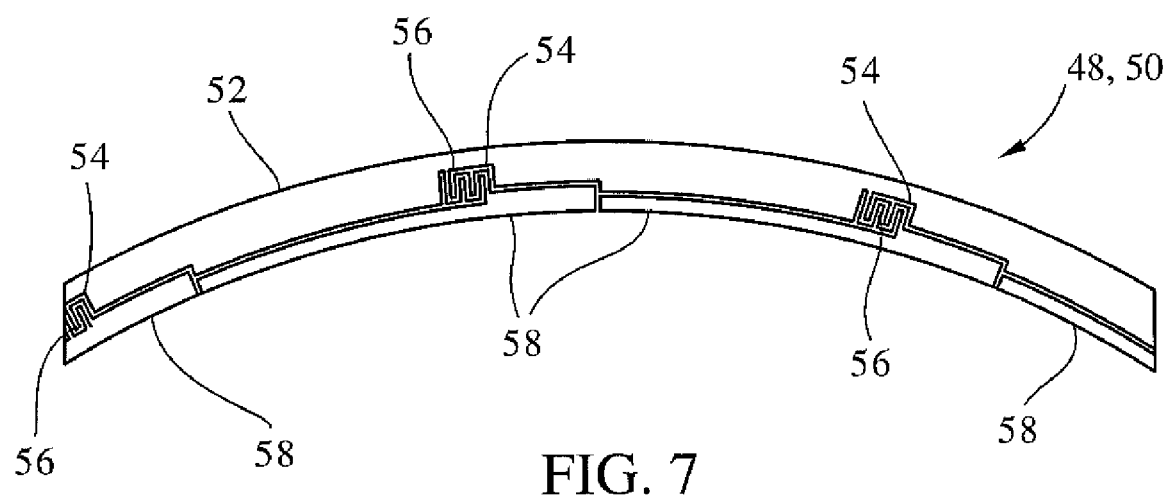
FIG. 7 is an elevational view of a portion of a sealing element.

Referring now to FIGS. 6 and 7, in the presently preferred embodiment the seal 10 is also provided with a secondary seal comprising a stack of at least two sealing elements 48 and 50. Each of the sealing elements 48 and 50 comprises an outer ring 52 formed with a number of circumferentially spaced openings 54, a spring member 56 mounted within each opening 56 and a number of inner ring segments 58 each connected to at least one of the spring members 56. The spring member 56 is depicted in FIG. 7 as a series of connected loops, but it should be understood that spring member 56 could take essentially any other form, including parallel bands as in the spring elements 24. The sealing elements 48 and 50 are oriented side-by-side and positioned so that the inner ring segments 58 extend into the slot 22 formed in the shoe 16. The spring members 56 deflect with the radial inward and outward movement of the shoe 16, in response to the application of fluid pressure as noted above, and create a secondary seal of the gap 11 between the rotor 14 and stator 12. As such, the sealing elements 58 and 50 assist the spring elements 24 in maintaining the shoe 16 within design clearances relative to the rotor 14.

In the presently preferred embodiment, the spring elements 48 and 50 are formed of sheet metal or other suitable flexible, heat-resistant material. The sealing elements 48 and 50 may be affixed to one another, such as by welding, a mechanical connection or the like, or they may merely placed side-by-side within the slot 22 with no connection between them. In order to prevent fluid from passing through the openings 54 in the outer ring 52 of each sealing element 48 and 50, adjacent sealing elements are arranged so that the outer ring 52 of one sealing element 48 covers the openings 54 in the adjacent sealing element 50. Although not required, a front plate 60 may be positioned between the spring element 24 and the sealing element 48, and a back plate 62 may be located adjacent to the sealing element 50 for the purpose of assisting in supporting the sealing elements 48, 50 in position within the shoe 16. See FIG. 5.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out the invention, but that the invention will include all embodiments falling within the scope of the appended claims.

What is claimed is:

1. A seal for sealing a circumferential gap between a first machine component and a second machine component which is rotatable relative to the first machine component about a longitudinal axis, comprising:

at least one shoe extending along one of said first and second machine components in a position to create a non-contact seal therewith, said at least one shoe being formed with a slot;

at least one spring element adapted to be connected to one of the first and second machine components and being connected to said at least one shoe, said at least one spring element being effective to deflect and move with said at least one shoe in response to the application of fluid pressure to said at least one shoe;

at least two sealing elements oriented side-by-side, each of said sealing elements comprising an outer ring formed with a number of circumferentially spaced openings, a spring member mounted within each of said openings and an inner ring segment connected to each of said spring members, said inner ring segments of each of said at least two sealing elements extending into said slot formed in said at least one shoe.

2. The seal of claim 1 in which said at least two sealing elements are oriented relative to one another so that said spaced openings in said outer ring of one sealing element are covered by said outer ring of an adjacent sealing element.

3. The seal of claim 1 in which said at least two sealing elements are fixed to one another.

4. The seal of claim 1 in which said at least two sealing elements are formed of sheet metal.

5. The seal of claim 1 in which a primary seal of the circumferential gap between the first and second machine components is created by said at least one spring element and said at least one shoe.

6. The seal of claim 5 in which a secondary seal of the circumferential gap between the first and second machine components is created by said at least two sealing elements and said at least one shoe.

7. The seal of claim 1 further including a back plate connected to one of the first and second machine components and being positioned adjacent to one of said at least two sealing elements.

8. The seal of claim 7 further including a front plate connected to one of the first and second machine components and being positioned between said at least one spring element and one of said at least two sealing elements.

* * * * *